United States Patent [19]
Coleman

[11] 3,734,198
[45] May 22, 1973

[54] POWER PLOW

[76] Inventor: Stephen N. Coleman, 101 Lakeview Drive, Dothan, Ala. 36301

[22] Filed: Jan. 6, 1971

[21] Appl. No.: 104,238

[52] U.S. Cl. ............... 172/258, 172/713, 172/292, 172/669, 248/13
[51] Int. Cl. .............................. A01b 69/00
[58] Field of Search .............. 172/123, 258, 256, 172/259

[56] References Cited

UNITED STATES PATENTS

| 1,153,800 | 9/1915 | Larkins et al | 172/258 |
| 3,680,640 | 8/1972 | Dawson | 172/258 |
| 1,571,082 | 1/1926 | Zimlich | 172/258 |
| 2,816,496 | 12/1957 | Hall | 172/256 |
| 1,553,919 | 9/1925 | Smith | 172/258 |
| 1,387,279 | 8/1921 | Luger | 172/256 |
| 1,245,121 | 10/1917 | Peters | 172/259 |
| 2,159,448 | 5/1939 | Olson | 172/256 |

Primary Examiner—Robert E. Pulfrey
Assistant Examiner—Stephen C. Pellegrino
Attorney—Oberlin, Maky, Donnelly & Renner

[57] ABSTRACT

A power plow for producing a single furrow having a traction increasing drive wheel, a caster for aid in steering and varying furrow depth and a support stand for machine storage.

4 Claims, 3 Drawing Figures

PATENTED MAY 22 1973 3,734,198

INVENTOR.
STEPHEN N. COLEMAN
BY
*Oberlin, Maky, Donnelly & Renner*
ATTORNEYS

POWER PLOW

This invention relates as indicated to a power plow and more particularly to a single furrow plow readily adaptable to a variety of cultivating functions.

Tractors or power plows as a general matter are used in a variety of different ways by a homeowner or farmer. For example, due to the costs involved, a plow must be capable of being employed with a number of different crops and for different stages of growth of an individual plant or vegetable. Such adaptability among other things requires ease of vehicle guidance, minimum width, interchangeability of cultivating instruments and variability of cultivating depth. Prior art plows of the general type here concerned have not satisfactorily combined these desired features into one apparatus.

Accordingly, a primary object of the present invention to provide a plow which is readily adaptable for any agricultural or residential cultivating use.

It is a further object of the present invention to provide a plow of relatively narrow width to permit cultivation on either side of the row regardless of the height of the plants in the row.

It is another important object of the present invention to provide a power plow having a caster assembly which swivels to permit the plow to be easily guided and which is carried by a vertically adjustable cultivator support assembly to have a number of different cultivating instruments associated therewith. The caster is vertically adjustable to permit the depth of the furrow to be varied as desired in accordance with operator adjustment and type of cultivating tool employed.

It is yet another object of the present invention to provide a plow having a single tractive drive wheel provided with annularly spaced, transverse cleats which function to increase the driving traction of the plow.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

Figure 1:
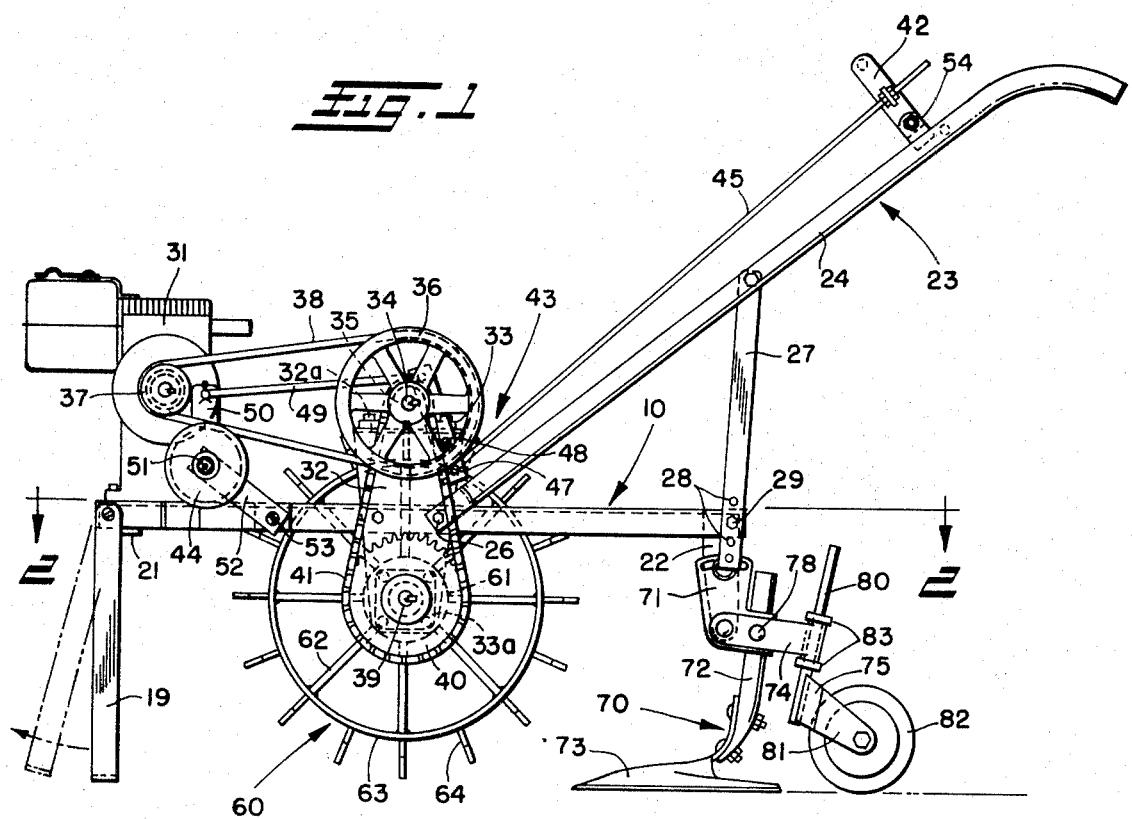
FIG. 1 is a side elevation of the plow of the present invention.

Referring now in more detail to the drawing, wherein like parts are indicated by like reference characters, the plow or cultivating tool of the present invention comprises a frame assembly, indicated generally at 10, a power source and means of transmission, indicated generally at 30, a drive wheel, indicated generally at 60, and a trailing plow and caster assembly, indicated generally at 70.

The frame includes two longitudinally extending angle plates forming side members 11 and 12 interconnected in any suitable manner, such as welding, nut and bolt fasteners or the like, to front and rear transverse angle members 13 and 15 to form a rigid, rectangular frame 10. A transverse plate member 14 is disposed between and rigidly connected to frame members 11 and 12 to support the power source as will be described in more detail hereinbelow. A downwardly extending bracket 22 is connected to the middle of the rear transverse end member 15 for a reason to be set forth hereinafter.

Pivotally connected to the frame 10 at the front thereof is a U-shaped support stand 19. The stand 19 is of sufficient height that when it is rotated to its vertical supporting position, shown in solid lines in FIG. 1, it serves to slightly elevate wheel 60 to an inoperative position, as shown in FIG. 1. Stop plates 21 extending outwardly beyond members 11 and 12 are welded to the under surface of the same to preclude rotation of the stand 19 past such vertical position. When the stand 19 is rotated clockwise, as shown in phantom lines 19' in FIG. 1, the wheel 60 is lowered into a ground contacting, operative position.

The handle, indicated generally at 23, is formed by two upwardly diverging tubular members 24 and 25 which are suitably connected to frame 10 as commonly indicated at 26. The handle is held in its upwardly and rearwardly extending position by two struts 27, only one of which is visible in FIG. 1, connected to side members 11 and 12. The lower portion of each strut 27 is provided with a plurality of vertically spaced holes 28 within any one of which a connective bolt 29 may be disposed to vary the angle of handle inclination. The handles are preferably of tubular construction so that throttle cable or other control devices may be contained therein, and a throttle lever or the like (not shown) of conventional construction is exposed exteriorly of the right handle for hand throttle control of the speed of the motor. In this regard, the motor 31 is preferably provided with gear reduction means for gearing down the speed of the output shaft to a ratio of approximately six to one.

The power source 30 includes a motor 31 supported by the transverse frame members 13 and 14. A pair of spaced vertical frame plates 32 are attached to side members 11 and 12 of frame 10. Each of the vertical frame plates 32 is formed with a top inwardly directed flange 32a on which is mounted a pillow block bearing 33. A drive sprocket shaft 34 is rotatably received in the pillow block bearing 33 and has attached at one end thereof both a drive sprocket 35 and exteriorly thereof a large pulley 36.

The output shaft of the motor 31 has a small pulley 37 keyed thereon, with a V-belt 38 extending around pulleys 36 and 37. The belt 38 loosely fits around pulleys 36 and 37 so that pulley 36 is not driven by the motor unless a clutch member is applied to the belt to tighten the same as will be discussed hereinafter.

The lower portions of the frame plates 32 have mounted thereon bearing blocks 32a for rotatably receiving traction wheel shaft 39. Shaft 39 has attached thereto a drive wheel 60, such as by keying or the like, which is positioned symmetrically between the side members of the frame. Also attached to shaft 39 is a lower drive sprocket 40, which is positioned exteriorly of plate 11. A drive chain 41 extends around upper sprocket 35 and lower sprocket 40 for driving the wheel 60.

The clutch assembly for tightening the V-belt 38 includes an operator lever 42, a linkage assembly indicated generally at 43, and an idler roller 44, the peripheral groove of which contacts the lower run of belt 38. The linkage assembly 43 includes an operator rod 45 which is connected at its rearward extremity to lever 42, with lever 42 being pivotally connected to bracket 54 mounted on the handle 23. At its forward end, rod 45 is pivotally connected to operator arm 47, which is pivotally connected at 48 to frame plate 32. Idler pulley rod 49 is pivotally connected at its rear and front ends, respectively, to the operator arm 47 and idler pulley bracket 50. The latter is nonrotatably connected at its lower end to idler pulley arm 52 by pin 51, with the arm 52 in turn being pivotally connected at 53 to side member 11 of frame 10. Pin 51 additionally serves as a spindle for idler pulley 44.

In operation of the linkage assembly 42, the operator, by pulling lever 42 rearwardly toward himself, causes operator arm 47 to rotate counterclockwise and idler pulley rod 49 to move to the left or forwardly as viewed in FIG. 1, thereby causing members 50 and 52 to articulate so as to effect movement of pin 51 upwardly and to the right as viewed in FIG. 1. Such articulation of members 50 and 52 is controlled by the length of rods 50 and 52 and the connection of rod 52 to side member 11 at 53, with the movement of rod 49 effecting movement of rods 50, 52, and pin 51 to compensate for the increased distance between the forward end of rod 49 and pivot point 53. With the upward and rearward movement of idler pulley 44, the peripheral groove of pulley 44 contacts V-belt 38 to tighten the same around drive pulleys 36 and 37. With the clutch assembly actuated, pulley 36 is driven by the output shaft of the motor 31, thereby driving the drive shaft 34 with its attached sprocket 35, which in turn drives chain 41 to rotate traction drive wheel 60.

When the operator lever is returned to its upright or perpendicular position with respect to handle 23, operator arm 47 is rotated clockwise and, accordingly, idler pulley 44 returns to the position shown in FIG. 1. With the forward and downward movement of pulley 44, belt 38 again becomes loose on pulleys 36 and 37 and the output power of motor 31 is not transmitted to traction drive wheel 60.

Figure 2:
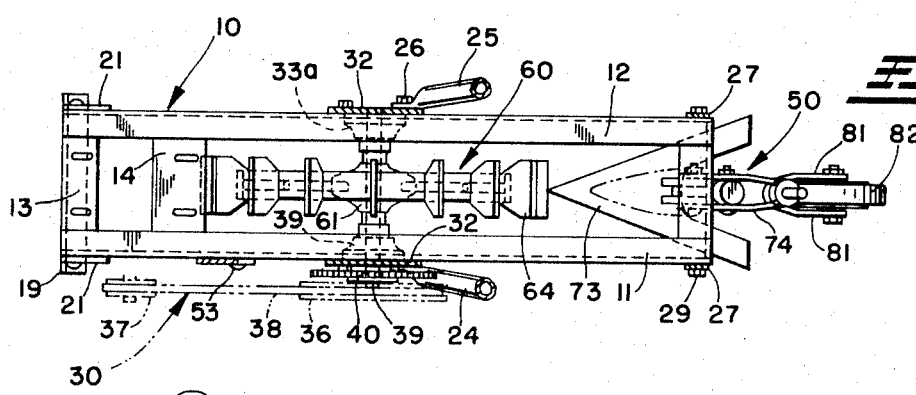
FIG. 2 is a partial horizontal section taken along line 2—2 of FIG. 1, with the drive wheel shown in full plan and the upper drive train shown in phantom.

Wheel 60 comprises an inner hub 61, a plurality of radial spokes 62, rim 63, and a plurality of annularly spaced, transverse cleats 64. As best shown in FIG. 2, cleats 64 are fan shaped having a ground contacting surface of greater width than the surface at the juncture of cleats 64 and rim 63. Cleats 64 provide better traction for wheel 60 than a conventionally formed rubber tire because the ground contact width is increased and cleats 64 perforate the surface of the ground over which the wheel is passed.

The plow and caster assembly indicated generally at 70 includes two spaced, L-shaped plow foot brackets 71, a plow foot 72, plow member or cultivator 73, a caster bracket 74 and caster 75. The foot brackets 71 are attached to frame bracket 22 and the lower portions thereof receive the plow foot 72 therebetween. Such foot is secured to the plow assembly by a bolt 78 passing through aligned holes in brackets 71 and the side leg portion of the caster bracket 74. As shown best in FIG. 2 the plow member 73 is generally V-shaped for enhanced penetrating effects.

Figure 3:
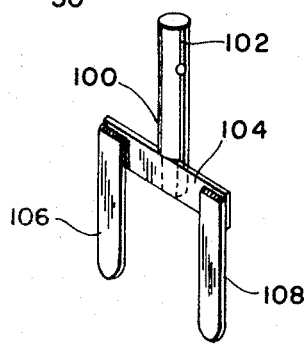
FIG. 3 is a perspective view of a cover foot, an accessory member.

It will be understood that other shaped plow members could be associated with plow foot 72. For example, there is illustrated in FIG. 3 an accessory for the plow, in the form of a cover foot member 100. This member is adapted to replace the plow member 73 when covering the furrow is desired. The cover foot 100 includes a shank 102, a cross piece 104 secured to the bottom of the shank, and two downwardly extending arms 106 and 108. These arms are spaced so as to penetrate the ground on either side of the furrow for moving the soil over the furrow where the furrow has been formed for seeding. The cover foot can be mounted on the caster bracket 74 in the same manner as the plow foot 72.

The caster 75 comprises a shaft 80 to which are mounted spaced caster flanges 81. A caster wheel 82 is mounted for rotation between flanges 81. The shaft 80 extends through a sleeve therefor carried by the caster bracket 74. Shaft collars 83 are positioned around the shaft 80, above and below the brackets 74, and are provided with means, for example set screws, for permitting rotational movement of the shaft in the bracket sleeve but preventing vertical movement of the shaft relative to the bracket. The set screws when released permit vertical adjustment of the shaft 80 relative to the bracket 74 thereby to vary the depth of the furrow cut by the plow member 73.

The rotation of the caster while in ground engagement aids the operator in steering the cultivator while the vertical adjustability of the caster 75, as above indicated, allows the furrow depth to be varied. Such variation in furrow depth results from the frame rotating about the axis of the traction drive wheel 60, whereby the relative positioning of the frame attached plow member with respect to the ground surface likewise varies when the caster is in ground engaging position.

The operation of the power plow will be obvious from the above description.

Other modes of applying the principle of the invention may be employed, change being made as regards the details described, provided the features stated in any of the following claims, or the equivalent of such be employed.

I claim:

1. A power driven plow for producing a single furrow in the ground over which it passes comprising, in combination, a relatively narrow light weight frame the width of which permits cultivation of crops between rows thereof regardless of crop height, an upwardly and rearwardly extending handle adjustably connected to said frame, a support member pivotally connected to said handle at one end thereof and at the other end adjustably connected to the rearward end of said frame, means carried by and extending downwardly from said frame for rotatably mounting within said frame a single traction drive wheel, a substantial part of said drive wheel being located below the plane of said frame, said wheel being provided on its outer periphery with a plurality of spaced transverse cleats, a motor mounted on the top of said frame adjacent the front end thereof, means operatively connecting said motor to said drive wheel including a belt and pulley drive means, clutch means actuated by a control lever mounted on said handle for selective driving or freeing said drive wheel, said clutch means cooperatively interconnecting said belt and pulley drive with said drive means wheel, a tool support means adjustably connected to said other end of said support member, a single downwardly extending plow member attached to said tool support means directly behind said wheel, said plow member being approximately the same width as the width of said frame, a relatively small caster adjustably secured to said tool support means behind said plow member to aid in steering of said plow, and means for vertically adjusting said caster relative to said plow member so that the distance between said frame and the ground, and thus the furrow depth, may be varied.

2. The combination of claim 1 further including a support stand pivotally connected to said frame in front of said power means, whereby said stand may be pivoted into and out of plow supporting position, said stand being of sufficient height to elevate said drive wheel above ground level when such stand is in plow supporting position.

3. The combination of claim 1 further including means for adjusting the inclination and thus the height of said handle relative to said frame.

4. The combination of claim 1 wherein said belt and pulley drive includes a drive pulley driven by said motor and a driven pulley operatively connected thereto through a belt drive, said clutch means including an idler pulley pivotally mounted on said frame and adapted to be moved into forceable engagement with said belt by said control lever for rotatably coupling said drive and driven pulleys through said belt.

* * * * *